US011486997B2

(12) United States Patent
Schoor

(10) Patent No.: US 11,486,997 B2
(45) Date of Patent: Nov. 1, 2022

(54) ANGLE ESTIMATION AND AMBIGUITY RESOLUTION OF RADAR SENSORS FOR MOTOR VEHICLES WITH A LARGE ANTENNA ARRAY

(71) Applicant: Robert Bosch GmbH, Stuttgart (DE)

(72) Inventor: Michael Schoor, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 210 days.

(21) Appl. No.: 16/957,509

(22) PCT Filed: Dec. 14, 2018

(86) PCT No.: PCT/EP2018/084922
§ 371 (c)(1),
(2) Date: Jun. 24, 2020

(87) PCT Pub. No.: WO2019/158254
PCT Pub. Date: Aug. 22, 2019

(65) Prior Publication Data
US 2021/0055404 A1 Feb. 25, 2021

(30) Foreign Application Priority Data
Feb. 15, 2018 (DE) .......................... 102018202290.9

(51) Int. Cl.
*G01S 13/44* (2006.01)
*G01S 7/35* (2006.01)
(Continued)

(52) U.S. Cl.
CPC .......... *G01S 13/4445* (2013.01); *G01S 7/352* (2013.01); *G01S 13/4454* (2013.01); *G01S 13/46* (2013.01);
(Continued)

(58) Field of Classification Search
CPC .. G01S 13/4445; G01S 13/4454; G01S 13/46; G01S 13/878
See application file for complete search history.

(56) References Cited

U.S. PATENT DOCUMENTS 6,140,963 A * 10/2000 Azzarelli ............. H01Q 21/205
342/442
2006/0022866 A1* 2/2006 Walton .................. H01Q 21/08
342/126
2017/0176583 A1* 6/2017 Gulden ............... G01S 13/9029

FOREIGN PATENT DOCUMENTS

JP H09311186 A 12/1997
JP H11271433 A 10/1999
(Continued)

OTHER PUBLICATIONS

International Search Report for PCT/EP2018/084922, dated Mar. 15, 2019.

*Primary Examiner* — Bernarr E Gregory
*Assistant Examiner* — Artem Melkunov
(74) *Attorney, Agent, or Firm* — Norton Rose Fulbright US LLP; Gerard Messina

(57) ABSTRACT

An angle-resolving radar sensor for motor vehicles, having an antenna system having a plurality of antennas set up for receiving, configured in various positions in a direction in which the radar sensor is angle-resolving, and having a control and evaluation device designed for an operating mode in which at least one antenna of the radar sensor that is set up for transmitting sends out a signal that is received by a plurality of the antennas of the radar sensor that are set up to receive, the control and evaluation device being designed, in the mentioned operating mode, for an individual estimation of an angle of a radar target to determine respective individual distances of the radar target for each of the evaluation channels, which correspond to different con-
(Continued)

figurations of transmitting and receiving antennas, and to use the individual distances in the estimation of the angle of the radar target.

8 Claims, 2 Drawing Sheets

(51) Int. Cl.
    *G01S 13/46*     (2006.01)
    *G01S 13/87*     (2006.01)
    *G01S 13/931*     (2020.01)
    *H04B 7/0413*     (2017.01)

(52) U.S. Cl.
    CPC .......... *G01S 13/878* (2013.01); *G01S 13/931* (2013.01); *H04B 7/0413* (2013.01); *G01S 7/356* (2021.05); *G01S 2013/466* (2013.01)

(56) References Cited

FOREIGN PATENT DOCUMENTS

| | | | |
|---|---|---|---|
| JP | 2002350533 A | 12/2002 | |
| JP | 2010096589 A | 4/2010 | |
| JP | 2010515878 A | 5/2010 | |

\* cited by examiner

ANGLE ESTIMATION AND AMBIGUITY RESOLUTION OF RADAR SENSORS FOR MOTOR VEHICLES WITH A LARGE ANTENNA ARRAY

The present invention relates to an angle-resolving radar sensor for motor vehicles, having an antenna system having a plurality of antennas set up to receive that are configured in various positions in a direction in which the radar sensor is angle-resolving, and having a control and evaluation device that is designed for an operating mode in which at least one antenna of the radar sensor set up to transmit transmits a signal that is received by a plurality of the antennas of the radar sensor set up to receive, the control and evaluation device being designed to carry out an estimation of an angle of a radar target in the mentioned operating mode.

BACKGROUND INFORMATION

Radar sensors are used in motor vehicles for example to measure distances, relative speeds, and azimuth angles of vehicles or other radar targets situated in front of the home vehicle. A plurality of antennas are then for example configured at a distance from one another along a horizontal, so that different azimuth angles of the located radar targets result in differences in the run lengths that the radar signals have to travel from the radar target to the respective antenna. These run length differences result in corresponding differences in the amplitudes and phases of the signals that are received by the antennas and evaluated in the associated evaluation channels. For the angle estimation, the fact is exploited that the amplitude and phase relations of the signals received by the various receive antennas are functionally dependent, in a characteristic manner, on the angle of the radar target. By compensating the (complex) amplitudes received in the various channels with corresponding amplitudes in an antenna diagram, the angle of incidence of the radar signal, and thus the azimuth angle of the radar target, can then be determined. Correspondingly, the elevation angle of a radar target can also be estimated using antennas configured vertically one over the other.

For a single target, the compensation between the received amplitudes and the amplitudes in the antenna diagram can be done by calculating, for each angle in the antenna diagram, a correlation between the vector of the measured amplitudes (given k evaluation channels, this is a vector having k complex components) and the corresponding vector in the antenna diagram. This correlation can be expressed by a so-called DML (Deterministic Maximum Likelihood) function that, given a particular vector of measured amplitudes, indicates for each angle the probability that the radar target is situated at this angle. The angle estimation is then the seeking of the maximum of this DML function.

In order to achieve a high angular resolution, the aperture of the antenna should be as large as possible. However, if the distances between the adjacent antennas are too large, ambiguities can occur in the angle measurement because, in the case of run length differences that differ by a whole-number multiple of the wavelength λ, the same phase relations are obtained between the received signals. An unambiguous angle measurement can be achieved for example with a ULA (Uniform Linear Array) structure in which the antennas are situated at distances of λ/2. However, in this case as the aperture increases the number of antennas also increases, and thus the number of required evaluation channels also increases, resulting in correspondingly high hardware costs.

A resolution of ambiguities can also be done by tracking of the radar targets, in which a radar target is followed over a longer period of time and a selection of an angle value from the ambiguous estimation takes place taking into account previous estimated angles from the course of the locations. However, the allocation requires time for each appearance of a new radar target. Moreover, the allocation can be subject to error in particular in the case of radar echoes that have noise, so that if ambiguities are present, discontinuous changes in the measured azimuth angle may sometimes occur.

In an MIMO (Multiple Input/Multiple Output) radar system, a greater angular resolution capacity is achieved by working not only with a plurality of receiving antennas, but also with a plurality of transmitting antennas, different combinations of transmitting and receiving antennas being evaluated, for example in time-division multiplexing or optionally also in frequency-division multiplexing or code-division multiplexing. The varying positions of the transmit antennas then result in additional phase differences, thus resulting in signals that are equivalent to signals that would be obtained with a configuration having a single transmitting antenna and additional (virtual) receiving antennas. In this way, the aperture is virtually enlarged, and thus the angular resolution is improved. However, this requires a plurality of transmitting antennas, so that the number of required evaluation channels also increases, resulting in correspondingly high hardware costs.

With regard to achieving the highest possible angular resolution, in an MIMO radar system it is advantageous if the virtual antenna array is thinned in such a way that the individual antennas have relatively large distances from one another. Under these conditions, however, the unambiguity condition is no longer met, so that ambiguities again occur, in particular in the case of radar echoes that have noise.

SUMMARY

In the course of a further increase in the performance of radar sensors, d,v estimations having increased resolution will be possible. An increase in the usable sensor size, i.e., the size or aperture of the antenna system, will also enable an increase in the accuracy of the angular estimation and an improved angular separation. In an FMCW (frequency-modulated continuous wave) measurement method having linear frequency ramps and an evaluation of the received signals using discrete Fourier transformation, in particular an FFT (fast Fourier transformation), the width of a distance bin of the Fourier transformation corresponds to a distance difference Δr, where Δr=c/(2F), where c is the speed of light and F is the frequency sweep of a linear frequency ramp of the FMCW transmit signal. This distance difference is also referred to herein as distance resolution.

Thus, the distance resolution is to be understood as the smallest distance difference at which (given the same relative speed) two measurement values of the distance from the radar sensor, in the given operating mode of the radar sensor, can still be mapped to separate bins. When an FFT is carried out, the distance resolution corresponds to the distance of two distance bins in the FFT, i.e., the width of one distance bin. Here and in the following, the terms "distance resolution" and "width of the distance bin" are used synonymously. Differing from this, the distance separability is understood as twice the width of the distance bin. If the bandwidth of a radar sensor is increased, then, for example given a frequency sweep of the transmit signal of F=2 GHz, a distance resolution of Δr=7.5 cm is possible. If at the same time the aperture, or the virtual aperture in the case of a MIMO radar sensor, is increased to values having similar order of magnitude, then, depending on the angle of a radar target, the run length differences between the received signals of individual antennas or evaluation channels may already be so large that, in the Fourier spectra of the evaluation channels, information about the amplitude and/or phase of the received signals, according to the evaluation channel, is contained not only in one frequency bin determined by the d,v estimation of an acquired radar target, but also in one or more adjacent frequency bins.

An object of the present invention is to provide a radar sensor that permits a new possibility for resolving ambiguities of an angle estimation.

According to the present invention, this object may be achieved in that, in the mentioned operating mode, for an individual estimation of an angle of a radar target for respective evaluation channels, which correspond to different configurations of transmitting and receiving antennas, an example control and evaluation device is designed to determine individual distances of the radar target in each case and to use the individual distances in the estimation of the angle of the radar target.

Individual distances can be determined for two or more evaluation channels. In this way, the difference between individual distances that are determined in individual evaluation channels can be used for the resolution of ambiguities of an angle estimation. In this way, for example other procedures for resolving ambiguities can be replaced or supported, by providing additional information.

For each evaluation channel, an average distance of the signal paths from the transmitting antenna to the radar target and from the radar target to the receiving antenna is assumed or determined as the individual distance.

The individual distances relate to the same position of the object. The measurements for the individual evaluation channels can, for example, be carried out simultaneously (for example if a plurality of receive antennas receive a signal of a transmit antenna) or at least at a very small temporal interval, or in temporally interleaved fashion, so that the same position can be assumed with respect to measurement precision.

In accordance with an example embodiment of the present invention, the antenna system is preferably a planar configuration of the antennas, such as an antenna array having a regular offset between the receiving antennas, or a thinned antenna array.

In addition, in accordance with an example embodiment of the present invention, the object may be achieved by an example method for angle estimation of radar targets for a radar sensor for motor vehicles having an antenna system having a plurality of antennas set up for reception, configured in various positions in a direction in which the radar sensor is angle-resolving, characterized in that for an individual estimation of an angle of a radar target, respective individual distances of the radar target are determined for each of the evaluation channels, which correspond to different configurations of transmitting and receiving antennas, and the individual distances are used in the estimation of the angle of the radar target.

Advantageous embodiments and developments of the present invention are described herein.

In a useful specific embodiment of the present invention, the control and evaluation device is designed, in the mentioned operating mode, to use the individual distances in the estimation of the angle of the radar target, taking into account positions of relevant antennas, in particular taking into account positions in the mentioned direction. For each evaluation channel, a middle position between the antennas used for transmission and for reception is usefully taken as the position, or is assumed as a known position.

In a specific embodiment of the present invention, the control and evaluation device is designed, in the mentioned operating mode, for an individual estimation of an angle of a radar target to carry out an estimation of the angle on the basis of first information and second information, the first information concerning amplitude relations and/or phase relations between signals of the respective evaluation channels, and the second information concerning a delimitation of a region of the angle, the control and evaluation device being designed, in the mentioned operating mode, for an individual estimation of an angle to determine the second information based on the individually determined distances. The first and the second information can be determined in any sequence and/or simultaneously.

In a specific embodiment of the present invention, the control and evaluation device is designed, in the mentioned operating mode, for an individual estimation of an angle of a radar target to carry out a first estimation of the angle on the basis of amplitude relations and/or phase relations between signals of the respective evaluation channels and, if a plurality of possible angle values are obtained as an ambiguous result of the first estimation of the angle, to select one of the possible angle values as the result of the estimation of the angle based on the individually determined distances. In other words, in the mentioned operating mode an ambiguity of the angle estimation is resolved based on the individually determined distances. For example, there is an investigation as to which of the ambiguous values best fits the various individual distances of the evaluation channels. Here, two or more evaluation channels can be used. The possible angle values can be determined for example on the basis of the first information, and the resolution of the ambiguity can for example correspond to a determination of a delimitation of the region of the angle (the second information).

In a specific embodiment of the present invention, the control and evaluation device is designed, in the mentioned operating mode, for an individual estimation of an angle of a radar target to carry out a delimitation of a region of the angle based on the individually determined distances, and within the delimited region to carry out an estimation of the angle on the basis of amplitude relations and/or phase relations between signals of the respective evaluation channels. In this way, based on the delimitation of the region an ambiguity of the angle estimation can be avoided. The delimitation of a region of the angle can correspond for example to the second information, the angle estimation being carried out based on the first information.

In a specific embodiment of the present invention, the control and evaluation device is designed, in the mentioned operating mode, for the selection of one of the possible angle values obtained as the ambiguous result of a first estimation of the angle to carry out a second estimation of the angle based on the individually determined distances, and to select one of the possible angle values on the basis of a comparison of the result of the second estimation of the angle with the possible angle values obtained in the first estimation. In this way, it is investigated which of the ambiguous values best fits the second angle estimation on the basis of the various individual distances of the evaluation channels. The second angle estimation can for example be coarser than the first, or can be an approximate estimation. In the case of selection as a function of a respective comparison of the possible angle values with an approximate second estimation of the angle, the comparison can at least support the selection if further information is available for checking the possible angle values and making a selection on the basis of the result of the check.

In a specific embodiment of the present invention, the control and evaluation device is designed, in the mentioned operating mode, to estimate the angle by trilateration or multilateration based on the individually determined distances. This approach to angle estimation is particularly good if the distance differences that result between individual antenna configurations of the evaluation channels are relatively large, such as in the case of an antenna system having a particularly large aperture. The trilateration or multilateration is based on the fact that on the basis of the knowledge of the respective distance of a radar target from known positions at the radar sensor the position, and thus the angle, of the radar target can be at least approximately inferred.

In a specific embodiment of the present invention, the control and evaluation device, in the mentioned operating mode, for the selection of one of the possible angle values obtained as the ambiguous result of a first estimation of the angle, is designed to check a sign of the angle value and/or to check an angle value corresponding to a straight-line orientation for plausibility with respect to a tendency of an allocation of the individually determined distances to positions of relevant antennas. For this purpose, for example it may be sufficient to distinguish between cases. Preferably, the following cases are distinguished:

- substantially (e.g., in the context of a threshold value) equal individual distances are to be allocated to different positions of relevant antennas;
- larger individual distances tend to be allocated to positions further left than smaller individual distances;
- larger individual distances tend to be allocated to positions further right than smaller individual distances.

As antenna position, again, for each evaluation channel a center position between the antennas used for transmission and for reception is usefully taken into account as the position, or is assumed as the known position.

The features mentioned for the present invention and for the specific embodiments are particularly advantageous if, in the radar sensor, for at least two evaluation channels a maximum distance difference to a radar target produced by the configurations of transmitting and receiving antennas is at least 40% of the distance resolution, or in particular is at least 80% of the distance resolution. Preferably, for at least two evaluation channels a maximum distance difference produced by the configurations of transmitting and receiving channels to a radar target is at least 20%, more preferably at least 33% or at least 40% or at least 50% or at least 80% or at least 100%, of the distance resolution. The maximum distance difference produced by the configurations of transmitting and receiving antennas can correspond to the (virtual) aperture of the antenna system, for example for angles in the range up to 90°.

In the following, exemplary embodiments are explained in more detail on the basis of the figures.

DETAILED DESCRIPTION OF EXAMPLE EMBODIMENTS

Figure 1:
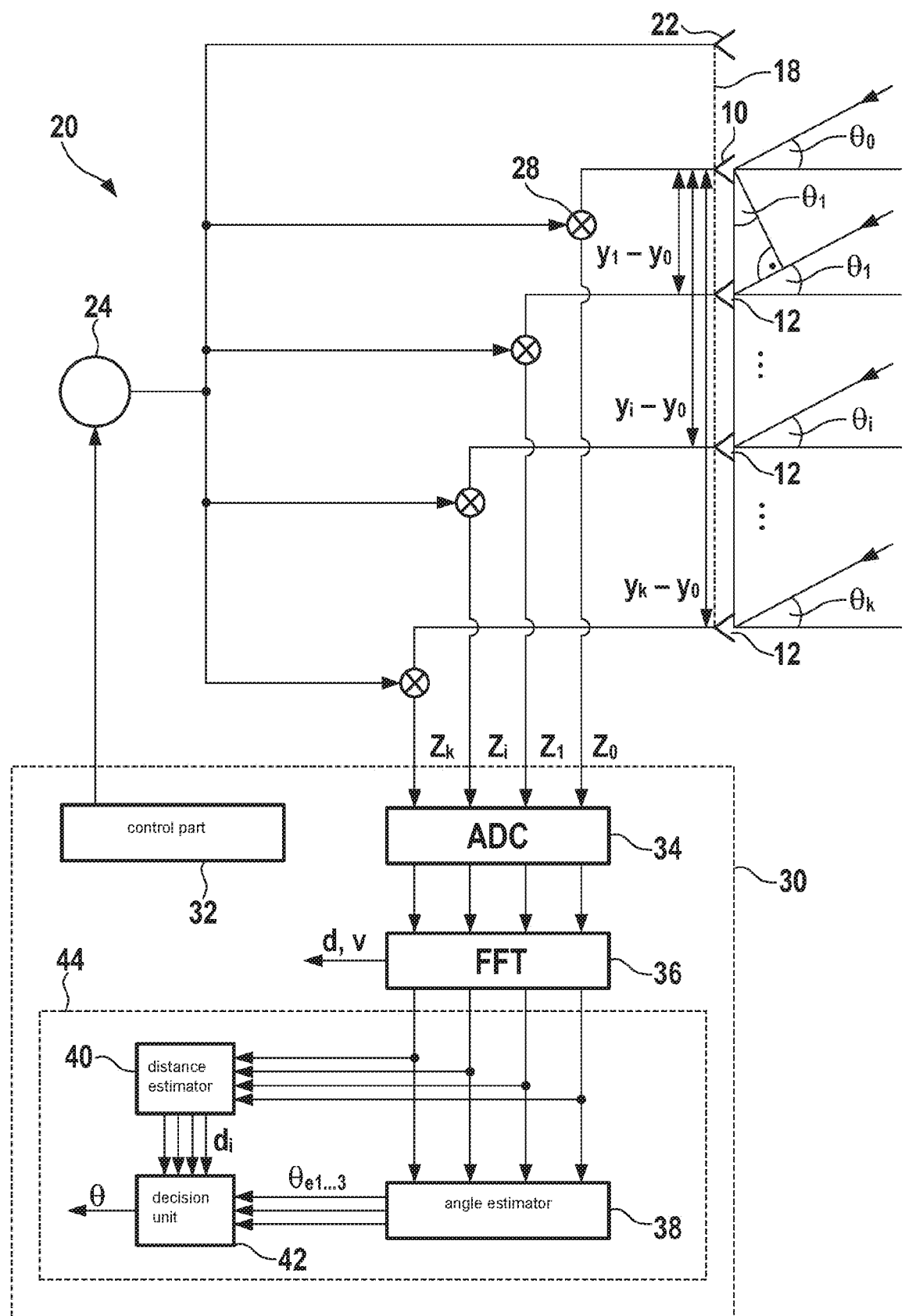
FIG. 1 shows a block diagram of a radar sensor according to the present invention.

The radar sensor shown in FIG. 1 has a plurality of receiving antennas or antenna elements 10, 12 on a common substrate 18. The radar sensor is installed in a motor vehicle in such a way that a plurality of antennas 10, 12 are situated alongside one another at the same height, at horizontal positions yi, i=0, . . . , k, so that an angle resolution capacity of the radar sensor in the horizontal (in the azimuth) is achieved. In FIG. 1, radar beams are shown symbolically that are received by the antennas at a respective azimuth angle $\theta i$.

A radio-frequency part 20 for controlling a transmitting antenna 22 includes a local oscillator 24 that produces the radar signal that is to be transmitted. The radar echoes received by antennas 10, 12 are each provided to a mixer 28, where they are mixed with a transmit signal supplied by oscillator 24. In this way, for each of the antennas 10, 12 a baseband signal or intermediate frequency signal Z0, Z1, . . . , Zi, . . . , Zk is obtained that is supplied to an electronic control and evaluation unit 30. Control and evaluation unit 30 contains a control part 32 that controls the function of oscillator 24. In the depicted example, the radar sensor is an FMCW radar unit, i.e., the frequency of the transmit signal supplied by oscillator 24 is periodically modulated in the form of a sequence of rising and/or falling frequency ramps.

In addition, control and evaluation device 30 contains an evaluating part having an analog/digital converter 34 having k channels, which digitizes the intermediate frequency signals Z0-Zk received by the k antennas 10, 12, and records each of them over the duration of an individual frequency ramp. The time signals obtained in this way are then converted channel-by-channel into corresponding frequency spectra using fast Fourier transformation, in a transformation stage 36. In these frequency spectra, each radar target is shown in the form of a peak whose frequency position is a function of the signal run time from the radar sensor to the radar target and back to the radar sensor, as well as being a function of the relative speed of the radar target due to the Doppler effect. From the frequency positions of two peaks obtained for the same radar target, but on frequency ramps having different slopes, for example a climbing ramp and a falling ramp, the distance d and the relative speed v of the relevant radar target can then be calculated in a conventional manner.

As is shown schematically in FIG. 1 on the basis of the radar beams, the various positions of antennas 10, 12 have the result that the radar beams emitted by one and the same antenna are reflected by the radar target and are then received by the various antennas, traveling different run lengths and thus having phase differences that are a function of the azimuth angle $\theta$ of the radar target. The associated intermediate frequency signals Z0-Zk have corresponding phase differences. The amplitudes (magnitudes) of the received signals are different from antenna to antenna, and are also a function of the azimuth angle $\theta$.

For each located object, i.e., each radar target (each peak in the frequency spectrum), an angle estimator 38 compares the complex amplitudes received in the k receive channels with the antenna diagram, in order in this way to estimate the azimuth angle θ of the radar target. As a result, for example an ambiguous result can be obtained having a plurality of possible angle values θe1, θe2, θe3 for azimuth angle θ.

However, given a high bandwidth, corresponding to a large frequency sweep of the FMCW modulation, and a large extension of the antenna system, the complex amplitudes in the individual receive channels are contained at different frequency positions fa(i) in the frequency spectrum of the received signal, according to the azimuth angle θ of the radar target and its distance d. This is illustrated schematically in FIG. 2, which shows successive frequency bins of the Fourier spectrum in the direction of increasing frequency f. In the Fourier transformation, a peak in the received signal at a frequency position fa is mapped to more than one frequency bin, according to the evaluation channel and angle, as is shown by hatching in FIG. 2. The frequency fref designates a middle frequency position that corresponds to the bin evaluated by the angle estimation.

Figure 2:
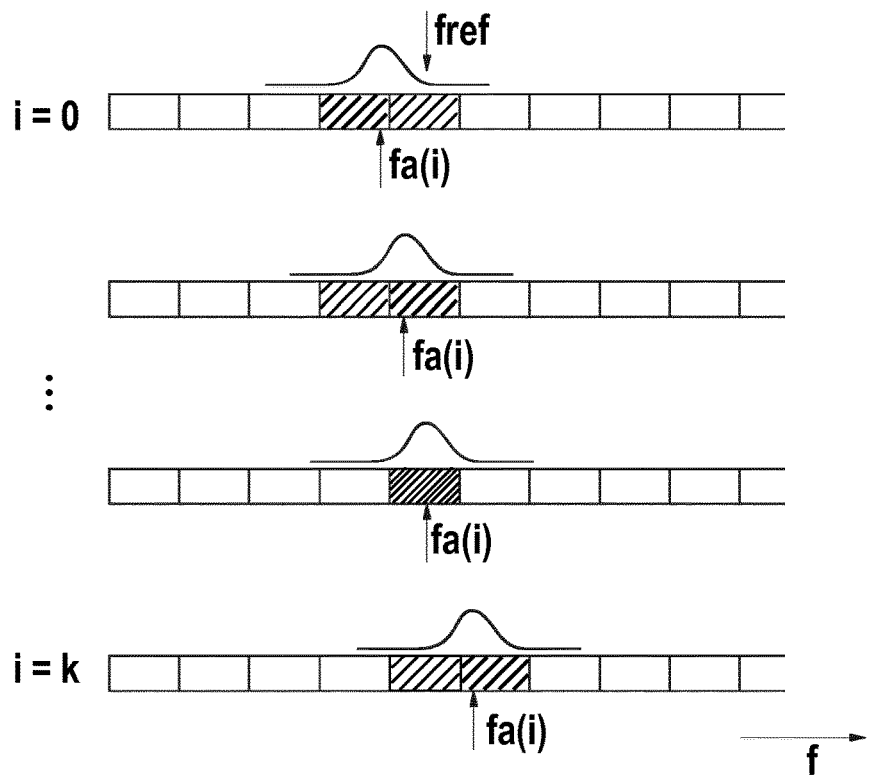
FIG. 2 shows a schematic representation of frequency bins of Fourier spectra of respective evaluation channels.

As FIG. 2 illustrates schematically, via a peak over the respective frequency spectrum, the more accurate position (frequency position) of a peak is then determined by a distance estimator 40, for example through interpolation of the spectrum at support points that have finer resolution than the distances of the frequency bins, and seeking the peak maximum, or through local adaptation (fitting) of a peak function to the spectrum.

As is shown in FIG. 1, for each evaluation channel i a decision unit 42 receives the estimated individual value of the distance di from the distance estimator, and receives the possibly ambiguous result of the angle estimation, i.e., the possible angle values θe1, θe2, θe3 of the azimuth angle, from angle estimator 38. Based on this, and taking into account the positions yi of each of the antennas, decision unit 42 chooses the angle value that best fits the individual distances di. This is explained in more detail in the following.

Figure 3:
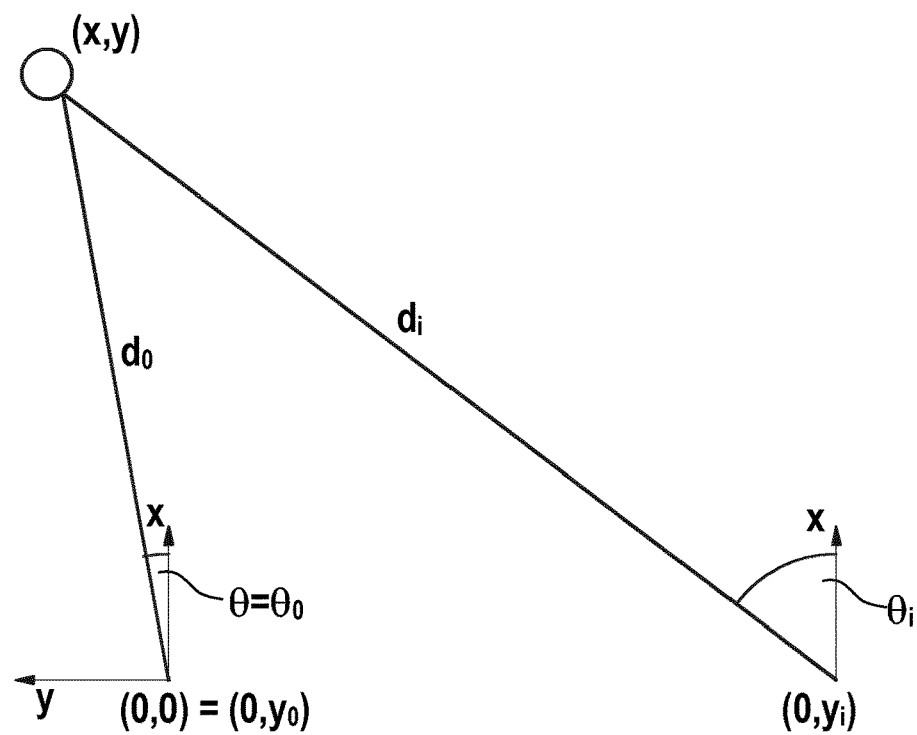
FIG. 3 shows a relation between two antennas and a radar target.

In a top view, for two antennas designated by indices 0 and i at the coordinates (0,y0) and (0,yi), FIG. 3 illustrates the relation to a point target as radar target at the coordinates (x,y). The distances of the point target from the individual antennas are designated d0, di, and the angle of incidence (azimuth angle) of the received radar signal is designated θ0 or θi. To simplify the representation, it is assumed that the origin (0, 0) is the midpoint of the antenna array and corresponds to a center position of receiving antennas 10, 12, and a monostatic system is described.

For each antenna having the index i, the following holds:

$$di=(x^2+y-yi^2)^{1/2}$$

and $\theta i = a\tan((y-yi)/x)$ for the individual positions and angles of the radar target.

As estimated variables of the radar sensor, the coordinates of the radar target relative to the origin are to be ascertained, i.e.

$$d=(x^2+y^2)^{1/2}$$

and $\theta = a\tan(y/x)$.

For each antenna, the difference from the average variables is:

$$\Delta di = di - d = (x^2+(y-yi)^2)^{1/2} - (x^2+y^2)^{1/2}$$

and $\Delta\theta = \theta i - \theta = a\tan((y-yi)/x) - a\tan(y/x)$, where Δdi is the distance difference and Δθi is the azimuth angle difference.

For the distance difference, the following holds:

$$\Delta d_i = d_i - d = \sqrt{x^2 + (y-y_i)^2} - \sqrt{x^2 + y^2} = $$
$$\sqrt{x^2 + y^2 - 2yy_i + y_i^2} - \sqrt{x^2 + y^2}$$
$$= \sqrt{x^2 + y^2}\sqrt{1 - \frac{2yy_i + y_i^2}{x^2 + y^2}} - \sqrt{x^2 + y^2} =$$
$$\left(\sqrt{1 - \frac{y_i(2y + y_i)}{d^2}} - 1\right)d$$
$$= (\sqrt{1+z} - 1)d =$$
$$\left(\frac{1}{2}z - \frac{1}{8}z^2 + \frac{1}{16}z^3 - \frac{5}{128}z^4 + \Lambda\right)d$$

with the Taylor series expansion in the last line for $$z = \frac{y_i(2y + y_i)}{d^2}.$$

The following results as an approximation for $|y| \gg |y_i|$ and thus small z:

$$z \approx -\frac{2yy_i}{d^2} = -\frac{2y_i}{d}\sin\theta.$$

There then results: $\Delta d_i \approx \frac{1}{2}zd \approx -y_i \sin\theta$.

As an approximation, via this easily implemented equation, the azimuth angle θ is estimated for each evaluation channel i from the differences Δdi of the distance and the relevant antenna positions yi. Through comparison with the possible, more accurately estimated angle values θe1, θe2, θe3, estimator 42 determines angle value ee, recognized as correct, as estimated azimuth value θ.

The individual distances di of the evaluation channels, "seen" by the radar sensor based on the run length differences, are a function of the antenna configuration. Thus, in a bistatic system, or an MIMO system, the effects (distance, or run time) for the path from the transmit antenna to the target, and from the target to the receive antenna, are added and averaged. The estimated distance di is determined for example via the overall run time of the signal, divided into the path out and the return path, and thus as the average distance over the average run time of the signal. The center position of the relevant transmit and receive antennas is determined as antenna position yi.

In an MIMO radar sensor, k evaluation channels correspond to different configurations of transmitting and receiving antennas.

In the example, angle estimator 38 forms a first stage of an angle estimator 44 that includes angle estimator 38, distance estimator 40, and decision unit 42.

In another example, decision unit 42 is set up to approximately estimate the angle θ from the individual distances di, taking into account the antenna positions yi through trilateration or multilateration, and to determine the angle θe as the estimated azimuth angle θ through comparison with the possible more accurately estimated angle values θe1, θe2, θe3.

Decision unit 42 is for example set up to check the possible angle values θe1, θe2, θe3 for plausibility with respect to a tendency of an allocation of the individually determined distances di to the positions yi of relevant antennas. For example, if the angles −30°, 0°, or 30°, as the ambiguous result of an angle estimation, are to be checked for plausibility, then the following cases can be distinguished: 1) for antenna positions to the left and to the right of a center antenna position, substantially identical individual distances are determined; the angle 0° is determined as plausible; 2) for a left antenna position, a greater individual distance is determined than for a right antenna position; the angle −30° (to the right of center) is determined as plausible; and: 3) for a left antenna position, a smaller individual distance is determined than for a right antenna position; the angle +30° is determined as plausible.

In another exemplary embodiment, the angle estimation takes place in a corresponding manner, but first a delimited angle region is inferred on the basis of a tendency of an allocation of the individually determined distances di to the positions yi of relevant antennas, for example "at the left side," "in the center with a tolerance width," "at the right side," and the angle estimation is then carried out in an unambiguous manner within the delimited angle region. The angle regions may overlap.

In another exemplary embodiment, an angle estimation takes place immediately on the basis of the individual distances determined by distance estimator 40, e.g., through trilateration or multilateration, without angle estimator 38 being present or being used.

In an exemplary embodiment, the operating mode, described above on the basis of examples, of control and evaluation device 30 is an operating mode provided for emergency operation. In normal operation, angle estimator 44 carries out a conventional angle estimation using angle estimator 38, and uses a conventional method to resolve ambiguities of the angle estimation. When there is a failure of one or more antennas, control and evaluation device 30 switches over to an emergency operating mode using the remaining antennas, in which the operating mode described above for angle estimation, or for resolving ambiguities, is used.

Antennas 10, 12, and 22 can be group antennas, each including an array of patches that are controlled with the same phase, or can be combined while receiving the phases to form a receive signal.

The exemplary embodiments described here are based on a bistatic antenna design. Optionally, however, a monostatic antenna design could also be used in which the same (group) antennas are used for transmission and for reception.

The described operation of the control and evaluation device can advantageously be used in particular in FMCW radar sensors that operate with so-called rapid chirp sequences. Here, a multiplicity of frequency ramps (chirps) having a large slope and a relatively short duration are gone through quickly in sequence.

What is claimed is:
1. An angle-resolving radar sensor for a motor vehicle, comprising:
an antenna system having a plurality of antennas set up for reception and configured in various positions in a direction in which the radar sensor is angle-resolving; and
a control and evaluation device that is configured to, for an operating mode in which at least one antenna of the radar sensor that is set up to transmit sends out a signal that is received by the plurality of antennas that are set up for reception, carry out an estimation of an angle of a radar target in the operating mode;
wherein in the operating mode, for an individual estimation of the angle of the radar target, the control and evaluation device is configured to determine respective individual distances of the radar target for respective evaluation channels, which correspond to different configurations of the at least one antenna that is set up to transmit and the plurality of antennas set up for reception and to use the individual distances in the individual estimation of the angle of the radar target;
wherein the control and evaluation device is configured, in the operating mode, for the individual estimation of the angle of the radar target to carry out a first estimation of the angle based on amplitude and/or phase relations between signals of each of the evaluation channels and, if a plurality of possible angle values are received as an ambiguous result of the first estimation of the angle, to select one of the possible angle values as a result of the estimation of the angle, based on the individually determined distances; and
wherein the control and evaluation device is configured, in the operating mode, for the selection of the one of the possible angle values received as the ambiguous result of a first estimation of the angle, to carry out a second estimation of the angle based on the equation $\sin\theta = -\Delta d_i/y_i$, where $\theta$ designates the angle to be estimated in the second estimation, i designates an evaluation channel, $\Delta d_i$ designates the difference between an individually determined distance for the evaluation channel i and a distance of a reference antenna position, and yi designates an antenna position for the evaluation channel i relative to the reference antenna position; and to select the one of the possible angle values based on a comparison of a result of the second estimation of the angle with the possible angle values obtained in the first estimation.

2. The radar sensor as recited in claim 1, wherein the control and evaluation device is configured to use, in the operating mode, the individual distances in the individual estimation of the angle of the radar target, taking into account positions of relevant ones of: the at least one antenna that is set up to transmit and the plurality of antennas set up for reception.

3. The radar sensor as recited in claim 1, wherein the control and evaluation device is configured, in the operating mode, for the individual estimation of the angle of the radar target, to carry out a delimitation of a region of the angle based on the individually determined distances, and to carry out, within the delimited region, an estimation of the angle based on amplitude and/or phase relations between signals of the respective evaluation channels.

4. The radar sensor as recited in claim 1, wherein the control and evaluation device is configured, in the operating mode, for the selection of the one of the possible angle values received as the ambiguous result of a first estimation of the angle, to carry out a second estimation of the angle based on the individually determined distances and to select the one of the possible angle values based on a comparison of a result of the second estimation of the angle with the possible angle values obtained in the first estimation.

5. The radar sensor as recited in claim 1, wherein in the control and evaluation device is configured, in the operating mode, for the selection of the one of the possible angle values received as the ambiguous result of a first estimation of the angle, to carry out a second estimation of the angle through trilateration or multilateration based on the individually determined distances, and to select the one of the possible angle values based on a comparison of a result of the second estimation of the angle with the possible angle values obtained in the first estimation.

6. The radar sensor as recited in claim 1, wherein the control and evaluation device is configured, in the operating mode, for the selection of the one of the possible angle values obtained as the ambiguous result of a first estimation of the angle, to check a sign of the angle value and/or to check an angle value corresponding to a linear orientation for plausibility with respect to a tendency of an allocation of the individually determined distances to positions of relevant antennas.

7. An angle-resolving radar sensor for a motor vehicle, comprising:
  an antenna system having a plurality of antennas set up for reception and configured in various positions in a direction in which the radar sensor is angle-resolving; and
  a control and evaluation device that is configured to, for an operating mode in which at least one antenna of the radar sensor that is set up to transmit sends out a signal that is received by the plurality of antennas that are set up for reception, carry out an estimation of an angle of a radar target in the operating mode;
  wherein in the operating mode, for an individual estimation of the angle of the radar target, the control and evaluation device is configured to determine respective individual distances of the radar target for respective evaluation channels, which correspond to different configurations of the at least one antenna that is set up to transmit and the plurality of antennas set up for reception and to use the individual distances in the individual estimation of the angle of the radar target;
  wherein the operating mode is a second operating mode, and wherein the control and evaluation device is configured, in a first operating mode, to estimate the angle of the radar target based on amplitude and/or phase relations between signals of the respective evaluation channels, which correspond to different configurations of transmitting and receiving antennas, the amplitude and/or the phase relations between the signals being evaluated at, in each case, the same frequency position in the evaluation channels that are used, and, in the case of failure of one or more antennas used in the first operating mode for transmitting and/or for receiving, the control and evaluation device is configured to carry out, in the second operating mode, the estimation of an angle of a radar target using at least one remaining antenna used for transmitting and using a plurality of remaining antennas used for receiving.

8. A method for the angle estimation of radar targets for a radar sensor for a motor vehicles, the radar sensor including an antenna system having a plurality of antennas set up for receiving, configured in various positions in a direction in which the radar sensor is angle-resolving, the method comprising:
  determining, in a second operating mode, an individual estimation of an angle of a radar target by:
    determining respective individual distances of the radar target for each of a plurality of evaluation channels, which correspond to different configurations of transmitting and receiving antennas; and
    using the individual distances in the estimation of the angle of the radar target; and
  estimating, in a first operating mode, the angle of the radar target based on amplitude and/or phase relations between signals of the respective evaluation channels, which correspond to different configurations of transmitting and receiving antennas, the amplitude and/or the phase relations between the signals being evaluated at, in each case, the same frequency position in the evaluation channels that are used, and, in the case of failure of one or more antennas used in the first operating mode for transmitting and/or for receiving, carrying out, in the second operating mode, the estimation of an angle of a radar target using at least one remaining antenna used for transmitting and using a plurality of remaining antennas used for receiving.

* * * * *